(12) United States Patent
Keightley

(10) Patent No.: US 9,022,703 B2
(45) Date of Patent: *May 5, 2015

(54) HOLE SAW ASSEMBLY

(76) Inventor: Kym John Keightley, Adelaide (AU)

(*) Notice: Subject to any disclaimer, the term of this patent is extended or adjusted under 35 U.S.C. 154(b) by 1239 days.

This patent is subject to a terminal disclaimer.

(21) Appl. No.: 12/797,767

(22) Filed: Jun. 10, 2010

(65) Prior Publication Data

US 2010/0247258 A1 Sep. 30, 2010

Related U.S. Application Data

(63) Continuation-in-part of application No. 12/580,242, filed on Oct. 15, 2009.

(51) Int. Cl.
 *B23B 51/04* (2006.01)
(52) U.S. Cl.
 CPC .................. *B23B 51/0473* (2013.01)
(58) Field of Classification Search
 USPC .......... 408/204–209, 703, 239 R, 238; 279/8, 279/89, 93, 94; 403/299, 348–349
 See application file for complete search history.

(56) References Cited

U.S. PATENT DOCUMENTS

| | | | |
|---|---|---|---|
| 3,267,975 A | 8/1966 | Enders | |
| 3,973,862 A | 8/1976 | Segal | |
| 4,669,928 A | 6/1987 | Mediavilla | |
| 5,108,235 A | 4/1992 | Czyzewski | |
| 5,154,552 A * | 10/1992 | Koetsch | 408/204 |
| 5,226,762 A | 7/1993 | Ecker | |
| 5,246,317 A | 9/1993 | Koetsch et al. | |
| 5,868,532 A | 2/1999 | Spenser | |
| 5,967,709 A | 10/1999 | Thuesen | |
| 6,120,221 A | 9/2000 | Alm | |
| 6,357,973 B2 | 3/2002 | Chao | |

(Continued)

FOREIGN PATENT DOCUMENTS

| | | |
|---|---|---|
| GB | 2257381 | 1/1993 |
| WO | 9714526 | 4/1997 |
| WO | 03024677 | 3/2003 |

*Primary Examiner* — Daniel Howell
(74) *Attorney, Agent, or Firm* — Sand & Sebolt

(57) ABSTRACT

The present invention relates to a hole-saw assembly includes a hole-saw having at one end a plurality of cutting teeth and with a boss attached to the hole-saw at the other end two shafts. The assembly includes a mandrel coaxially aligned with said hole-saw and including a body having two bores there through coaxially aligned with said shafts. An annulus located on top of the body is coaxially aligned with said mandrel and hole saw and includes two holes, the annulus rotatable around its longitudinal axis from a first to a second position. In the first position the annulus holes are aligned with the bores and shafts allowing the shafts to be freely insertable and removable and in the second position the holes are misaligned to lock the shafts to the annulus. The mandrel further includes a pair of driving pins adapted to engage driving apertures found in hole-saws especially larger ones. Typically the driving pins may be biased to enable the assembly to be used even with those hole-saws that do not include driving apertures and that also enables easier assembly of the device. A compressible O-ring may further facilitate the operation of the assembly. This device avoids the problem of thread stripping. The invention further provides for a boss that can be used with larger hole-saws and includes notches that accommodate driving pains extending on the side of the boss and where appropriate into the driving apertures.

9 Claims, 8 Drawing Sheets

(56) References Cited

U.S. PATENT DOCUMENTS

| | | |
|---|---|---|
| 6,623,220 B2 * | 9/2003 | Nuss et al. .................... 408/204 |
| 6,705,807 B1 | 3/2004 | Rudolph et al. |
| 6,857,831 B2 | 2/2005 | Davis |
| 7,073,992 B2 | 7/2006 | Korb et al. |
| 7,097,397 B2 | 8/2006 | Keightley |
| 7,101,124 B2 * | 9/2006 | Keightley .................... 408/204 |
| 7,104,738 B2 * | 9/2006 | Cantlon ........................ 408/204 |
| 7,163,362 B2 | 1/2007 | Keightly |
| 7,175,372 B2 * | 2/2007 | Davis ............................ 408/204 |
| 7,621,703 B2 * | 11/2009 | Keightley .................... 408/204 |
| 7,850,405 B2 * | 12/2010 | Keightley .................... 408/204 |
| 7,959,371 B2 * | 6/2011 | Keightley .................... 403/348 |
| 2004/0179911 A1 | 9/2004 | Keightlev |
| 2007/0036620 A1 | 2/2007 | Keightley |
| 2010/0322730 A1 * | 12/2010 | Keightley .................... 408/204 |

* cited by examiner

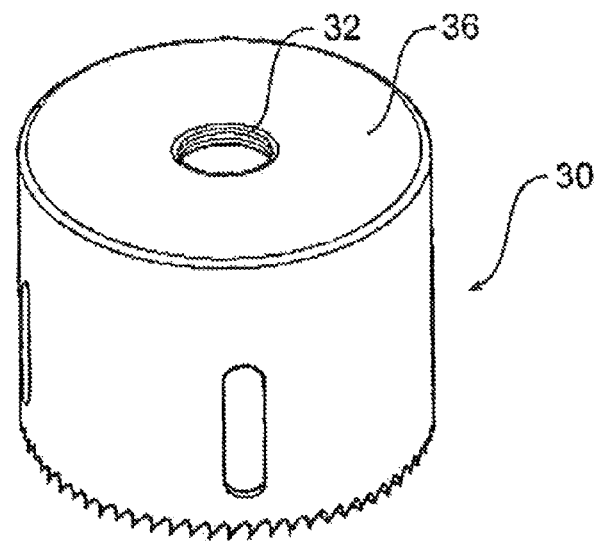
Fig 3a
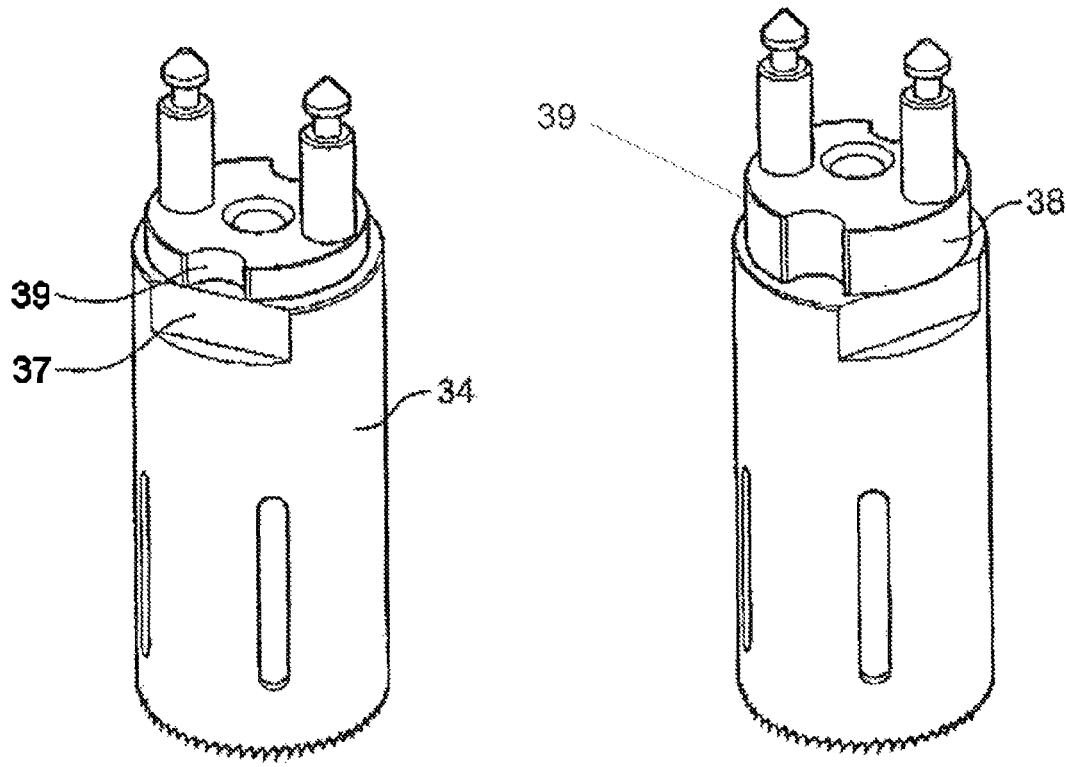
Fig 3b          Fig 3c

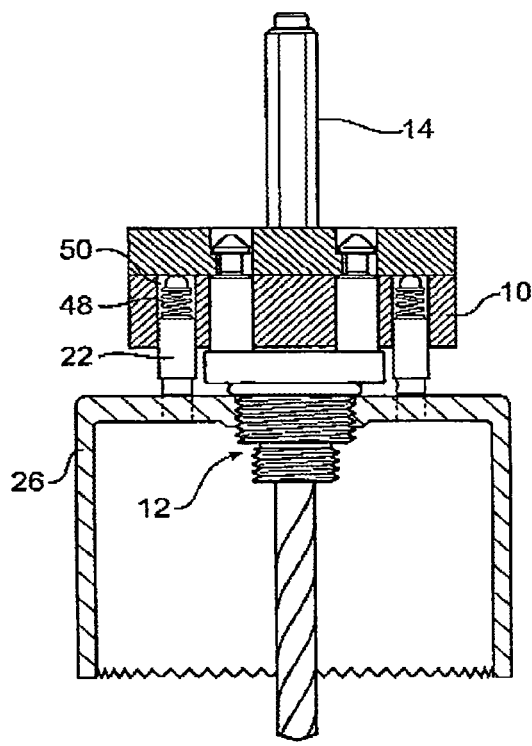
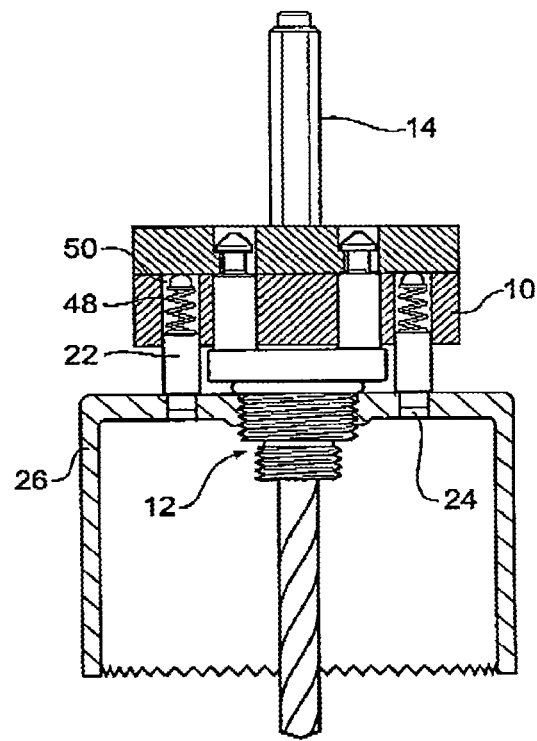
Fig 7a                    Fig 7b

HOLE SAW ASSEMBLY

CROSS-REFERENCE TO RELATED APPLICATIONS

This application is a continuation-in-part of U.S. patent application Ser. No. 12/580,242, filed Oct. 15, 2009, which claims benefit of U.S. patent application Ser. No. 11/628,453, now U.S. Pat. No. 7,621,703, filed Sep. 10, 2007, which entered the National Phase of Serial No. PCT/AU2005/000817, filed Jun. 8, 2005. The entire disclosure of these prior applications are hereby incorporated by reference.

BACKGROUND OF THE INVENTION

The present invention relates to a holes saw and in particular to a rotatable hole saw supported by a mandrel which is inserted in a drill chuck or the like. The invention can however be used not only to support hole saws but also provide a general connector assembly.

Hole saws are widely used to cut circular holes for many applications. Typically a hole saw is cylindrically shaped with cutting teeth at one end and a threaded boss at the other for screwing into a mandrel for rotational operation in a drill.

A pilot drill extends from the centre of the mandrel and through the centre of the hole saw as it is screwed onto the mandrel. As it always protrudes further than the length of the hole saw blade and hence contacts the material to be cut first, the pilot drill is the first to cut the hole in the material and acts as the exact centre of the hole saw diameter. This hole then acts as a guide or "pilot" around which the hole saw then concentrically cuts a larger hole.

In a previous application PCT/AU02/01296, whose contents are incorporated by express reference herein, the present applicant disclosed an arrangement whereby a threaded boss is screwed into a hole saw which is then quickly mounted and demounted from a mandrel.

However in very large hole saws, the rotational force developed (or torque required to rotate the hole saw) when operating the mandrel in heavier machinery may strip the thread where the hole saw couples with the boss. This may also be true when cutting through very hard material.

To overcome these problems, in a further application PCT/AU2004/000376, whose contents are also incorporated herein by express reference thereto, there is proposed an apparatus for overcoming the problem of stripping threads by the insertion of two loose pins to engage the boss and saw to avoid driving on the threads.

The problem with this type of arrangement is that it is awkward to assemble the apparatus and use the pins which, when the hole saw is not engaged to the mandrel, are loose and can easily be lost. Further the hole saw may be somewhat loose on the mandrel when such pins are used, since they are abutting against the mandrel and may separate the mandrel from the boss.

It is an object of the present invention to overcome at least some of the above-mentioned problems or provide the public with a useful alternative.

SUMMARY OF THE INVENTION

Therefore in one form of the invention there is proposed a hole-saw assembly including:
a hole-saw having at one end a plurality of cutting teeth and at least one driving aperture, said hole-saw including a centre thread;
a boss including a threaded shaft adapted to engage the hole-saw centre thread, said boss including two locking shafts;
a mandrel coaxially aligned with said hole-saw and including a body having two bores therethrough coaxially aligned with said locking shafts;
an annulus coaxially aligned with said mandrel and hole saw and including two holes, said annulus rotatable around its longitudinal axis from a first to a second position, wherein in said first position said annulus holes are aligned with said bores and said shafts allowing said shafts to be freely insertable and removable and in said second position said holes being misaligned thereby locking said shafts to said annulus;
at least one driving pin integrally attached so said mandrel and adapted to engage said at least one driving aperture.

In preference there are two symmetrically opposing driving apertures.

In preference the hole-saw assembly further includes a compressible O-ring positioned between said boss and said hole-saw.

In preference the shafts include a flute adjacent said outer end and a cap on said outer end, the cap having an inner surface adapted to engage the annulus when said annulus is in said second position to thereby lock the shafts from longitudinal movement from the annulus.

In preference the hole-saw assembly includes a drill-bit mounted on said mandrel, said drill-bit extending through and beyond said hole-saw.

In preference the at least one said driving pin is longitudinally biased.

In preference the biasing is provided by a spring.

In preference the boss includes a notch so dimensioned to accommodate the driving pin to extend along side the boss.

In preference the boss includes two notches so located and dimensioned to accommodate the driving pins to extend along side the boss.

In preference the driving pins are so dimensioned to extend along side the boss and engage the driving apertures of the hole-saw.

In a further form of the invention there is proposed a boss for use with a hole saw and a mandrel, the hole saw having two driving apertures, said boss including a threaded shaft to engage a centre thread of the hole saw and an attachment means to attach the boss to the mandrel;
said boss including two symmetrically opposed notches of a location and dimension to provide longitudinal access to the driving apertures by driving pins supported by the mandrel.

In a still further form of the invention there is proposed a hole-saw assembly including:
a hole-saw having at one end a plurality of cutting teeth and two driving apertures, said hole-saw including a centre thread;
a boss including a threaded shaft adapted to engage the hole-saw centre thread, said boss including an attachment means to attach the boss to a mandrel said boss further including two notches so located and of a size to co-axially align with the driving apertures;
two driving pins integrally attached to said mandrel and adapted to engage the driving apertures passing through the notches.

In a still further form of the invention there is proposed a connector assembly including:
a base having a longitudinal axis and including an attachment means for attaching a device thereto, said base further including a connecting means;
a co-axial mating means adapted engage said base;
a co-axial locking ring adapted to rotate around its longitudinal axis between a first and a second position relative to said mating means, said locking ring adapted to engage said base connecting means when in said first position to prevent longitudinal relative motion of said base, mating means and said locking ring;

a set of driving pins integrally attached to said base and adapted to engage correspondingly shaped driving apertures in said device.

In a yet further form of the invention there is proposed a hole saw assembly including a hole-saw, a boss, and a mandrel;

the hole saw having at one end a plurality of cutting teeth and at the other end at least one driving aperture;

the boss having at one end at least one thread for engaging the hole saw and at the other end a means for engaging the mandrel;

the mandrel coaxially aligned with the hole saw and having a means to lockably engage the boss and including a body having at least one driving pin adapted to engage the at least one driving aperture.

In preference the boss means for engaging the mandrel are two shafts adapted to engage two bores in said mandrel.

In preference the means to lockably engage the boss includes an annulus coaxially aligned with said mandrel and hole saw and including two holes, said annulus rotatable around its longitudinal axis from a first to a second position, wherein in said first position said annulus holes are aligned with the bores and said shafts allowing said shafts to be freely insertable and removable and in said second position said holes are misaligned thereby locking said shafts to said annulus;

In a further form of the invention there is proposed a hole saw assembly including a hole-saw, a boss, and a mandrel;

the hole saw having at one end a plurality of cutting teeth and at the other end at least one driving aperture;

the boss having at one end at least one thread for engaging the hole saw and at the other end a means for engaging the mandrel;

the mandrel coaxially aligned with the hole saw and having a means to lockably engage the boss and including a body having at least one biased driving pin adapted to engage the boss.

BRIEF DESCRIPTION OF THE DRAWINGS

The accompanying drawings, which are incorporated in and constitute a part of this specification, illustrate several implementations of the invention and, together with the description, serve to explain the advantages and principles of the invention. In the drawings.

FIG. 3(a) illustrates a larger size hole saw with no provision for engagement of driving pins;

Figure 4A:
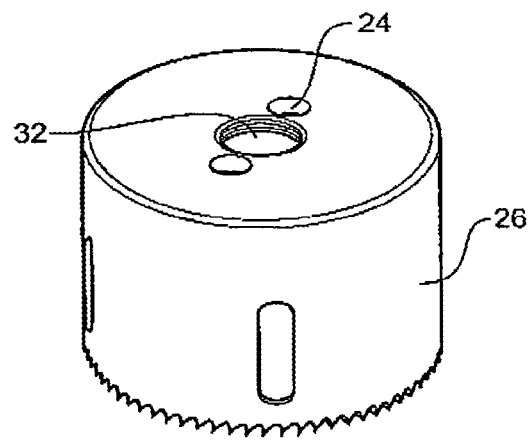
Figure 5:
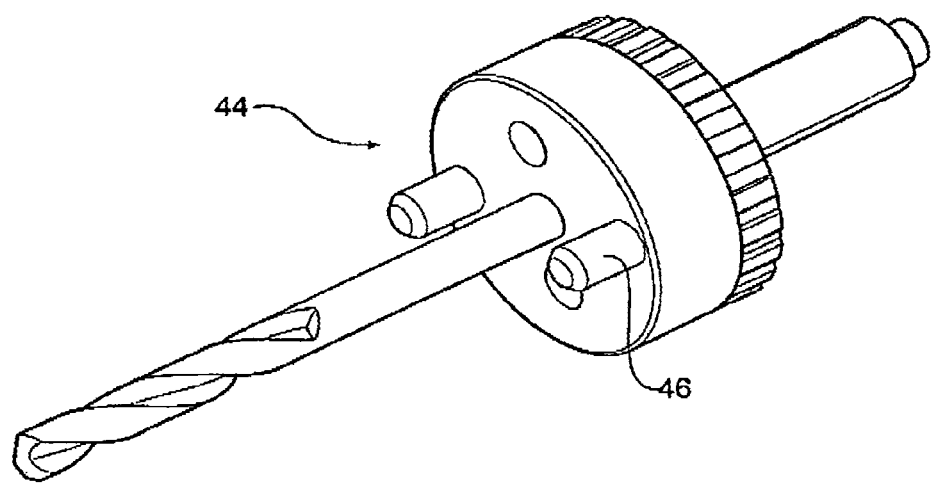
Figures 6A, 6B:
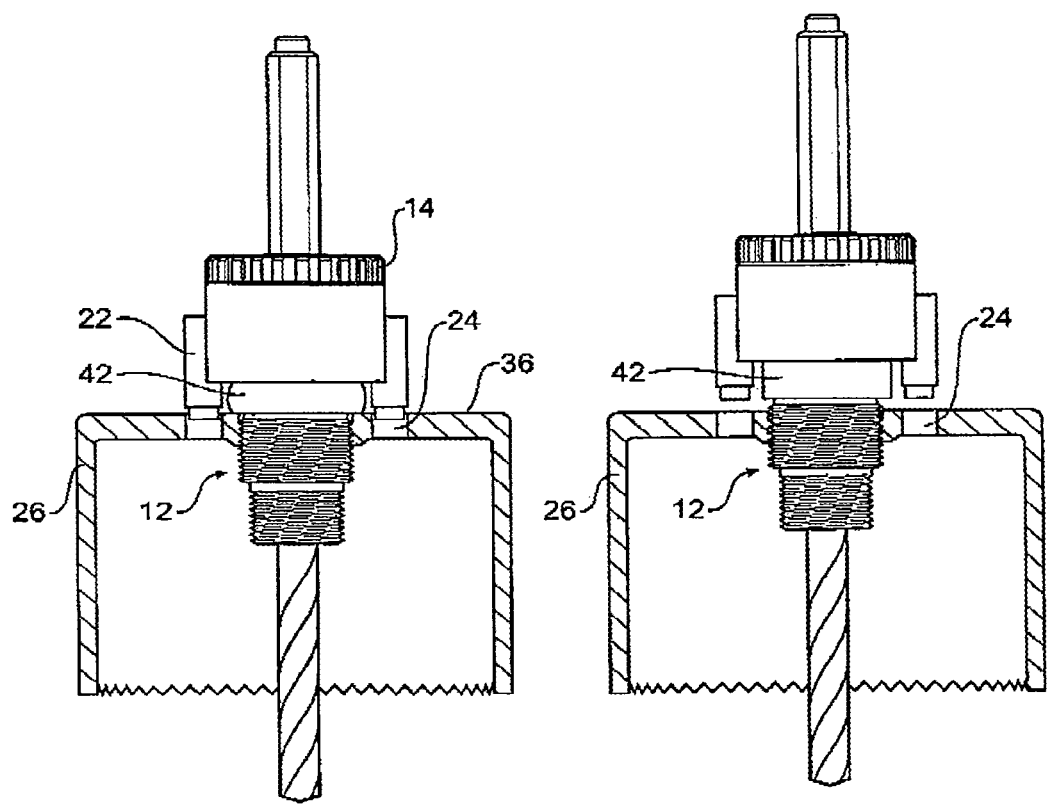
Figure 8:
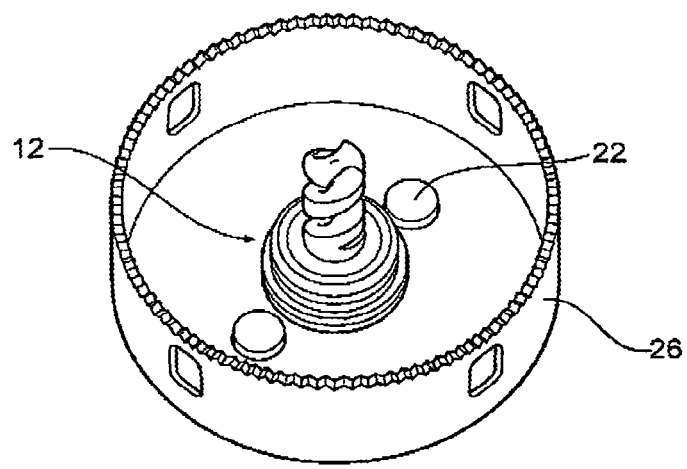
Figure 9:
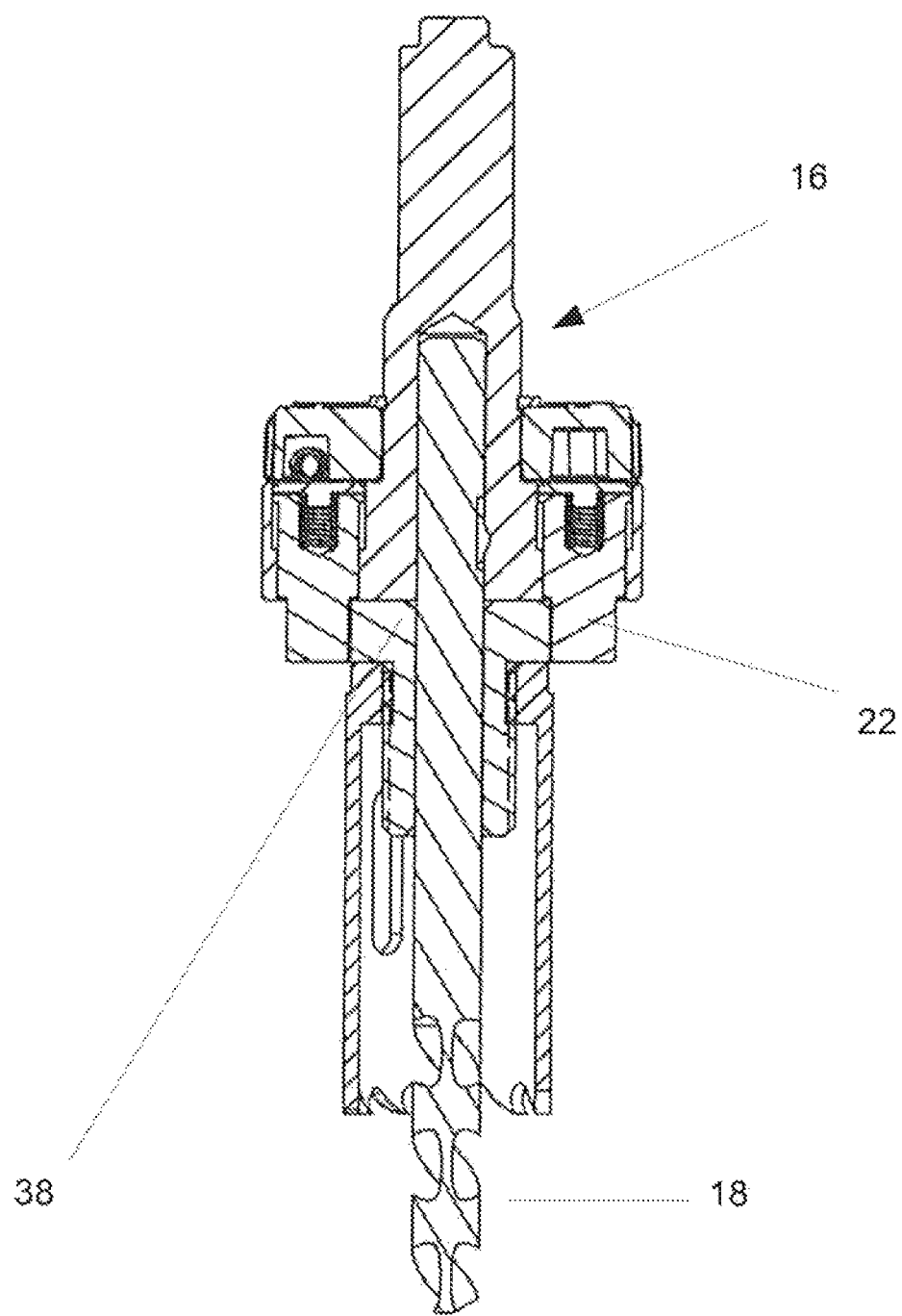

(b) illustrates a small size hole saw with a normal depth boss;

(c) illustrates a small size hole saw with a deeper depth boss;

FIG. 4(a) illustrates a large hole saw with driving pin holes for engagement of driving pins;

(b) illustrates the hole saw as in 4(a) when attached to a boss;

(c) is a cross-sectional view of the hole saw of 4(b);

FIG. 5 is a perspective view of a mandrel embodying the present invention and including integral driving pins;

FIG. 6(a) is a cross-sectional of the mandrel of FIG. 5 engaging a hole saw having provision for driving pin engagement before being screwed completely onto the hole saw;

(b) is the view as in 5(a) but when the boss is screwed onto the hole saw and the assembly is operational;

FIG. 7(a) illustrates a further embodiment of the present invention when the driving pins are in a biased configuration and when the assembly is being screwed onto a hole saw having driving pins;

(b) illustrates the assembly as in 7(a) when screwed onto the hole saw;

FIG. 8 is a perspective view of the underside of the hole saw and assembly of FIG. 7(b); and FIG. 9 is the assembly as in FIG. 7 but when used on a hole saw not having driving pins provisions.

DESCRIPTION OF THE PREFERRED EMBODIMENTS

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

The present invention, as mentioned above, relates to an improvement in a hole-saw assembly of the type described in PCT/AU03/01296 and that includes a hole-saw having at one end a plurality of cutting teeth and at the other end two shafts. The assembly includes a mandrel coaxially aligned with said hole-saw and including a body having two bores there through, coaxially aligned with said shafts. An annulus located on top of the body is coaxially aligned with said mandrel and hole saw and includes two holes, the annulus rotatable around its longitudinal axis from a first to a second position. In the first position the annulus holes are aligned with the bores and shafts allowing the shafts to be freely insertable and removable, and in the second position the holes are misaligned to lock the shafts to the annulus. Such an arrangement allows the hole-saw and the mandrel to be easily and quickly mountable and demountable.

To prevent stripping the threads as proposed in PCT/AU2004/000376 the hole saw assembly may include floating drive pins that are configured to fit within the pre-existing apertures of the hole saw. These pre-existing aperture are a feature of all hole saws and are used to engage older hole saw mandrels.

The present invention seeks to improve upon this arrangement making it easier to assemble the assembly. In a further embodiment the present invention may also provide for a mandrel including integral driving pins that may be used on a hole saw that does not include any pre-existing driving apertures.

Figure 1:
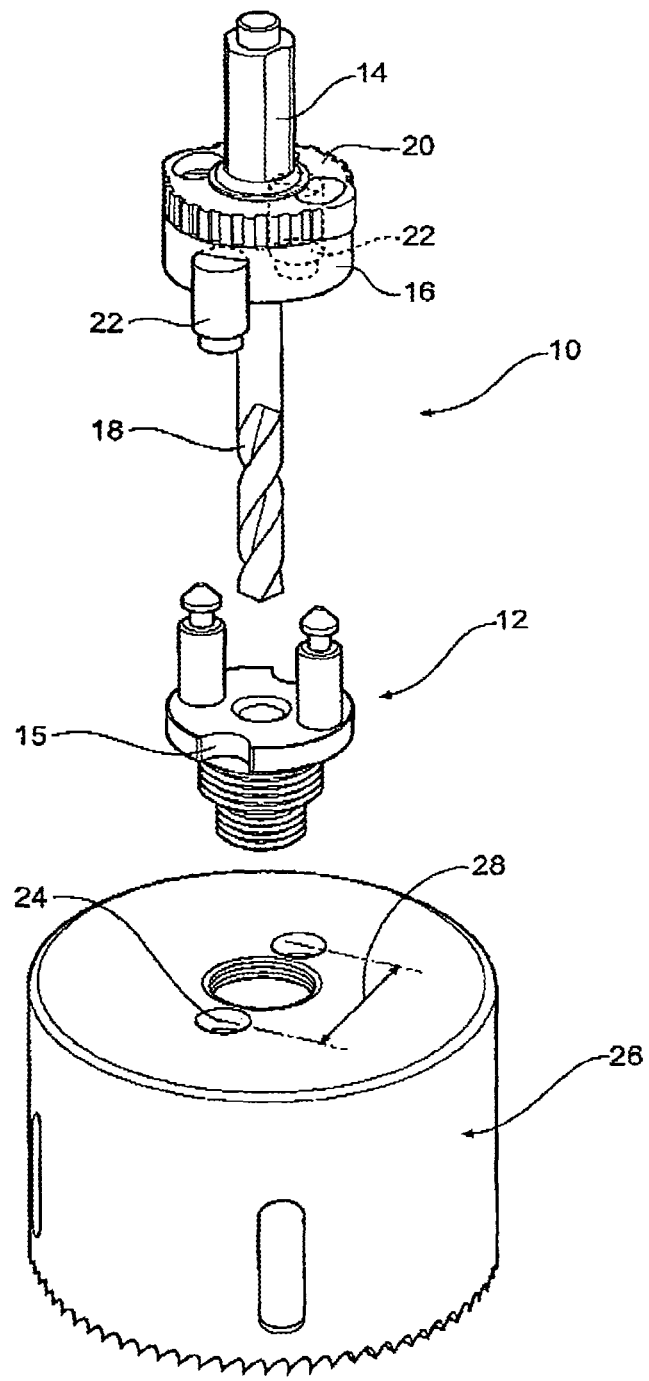
FIG. 1 is a perspective exploded view of a mandrel and hole saw assembly embodying the present invention.

FIG. 1 illustrates an exploded view of a hole saw assembly 10 including a double threaded boss 12. The hole saw assembly includes a shank 14, a mandrel 16 (or driving means, alternatively referred to as an arbor), a drill bit 18, and an annulus 20 (or locking ring) that locks the boss 12 to the mandrel 16. For specific details of the hole saw assembly the reader is referred to the applicant's International Patent Application PCT/AU02/01296 whose content is incorporated by reference herein.

Figure 2:
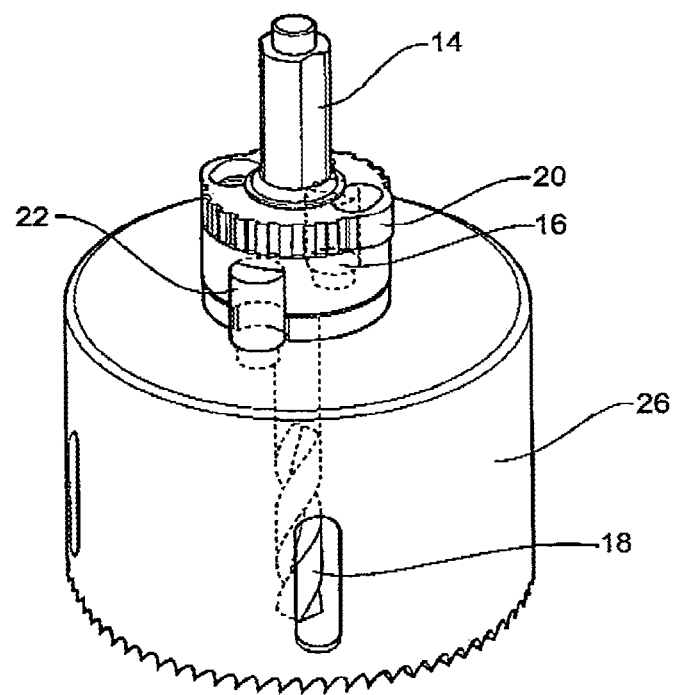
FIG. 2 is the assembly of FIG. 1 when in an assembled state.

To avoid stripping the threads of a hole saw, especially where there are significant rotational forces, the mandrel 16 further includes integrated driving pins 22 that are adapted to engage driving apertures 24 of the hole saw 26. Typically there are two driving pins located opposite each other. As illustrated in FIG. 2, when the boss 12 has been screwed onto the hole saw 26, the driving pins 22 are of a length sufficient to extend into the driving apertures 24.

The driving apertures are typically found in hole saws whose diameter is greater than some 32 mm, since the separation 28 of the driving pins is conventionally 25 mm (centre to centre of each pin). However, some hole saws may indeed not have driving apertures if they are, for example, being used to cut soft materials. An example of such hole saws are found in FIGS. 3(a) and 3(b), the former hole saw 30 with a less then than 32 mm diameter only including centre thread 32 and the latter smaller hole saw with a diameter just greater than 25 mm. If one were to use the mandrel as illustrated in FIG. 1 then the driving pins, having a longer length, would abut against the top surface 36 of the hole saw. To overcome this problem one may very well have a separate boss 38 as illustrated in FIG. 3(c) whose thickness is greater than the extension of the driving pins so that even when fully screwed onto the holes saw the driving pins are not in contact with the surface 36. As shown in FIG. 3(b) some smaller hole saws include a indent 37 that is typically provided to enable a tool such as a wrench to engage the hole saw.

Figure 4B:
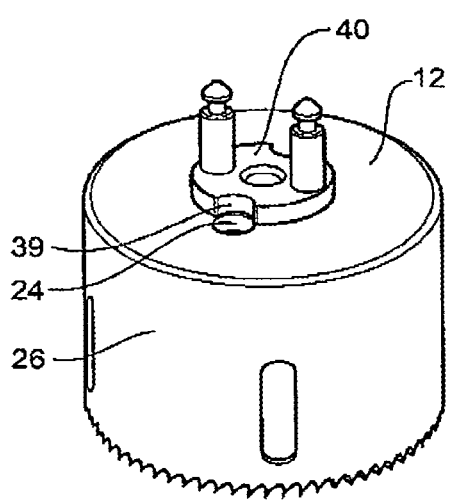
Figure 4C:
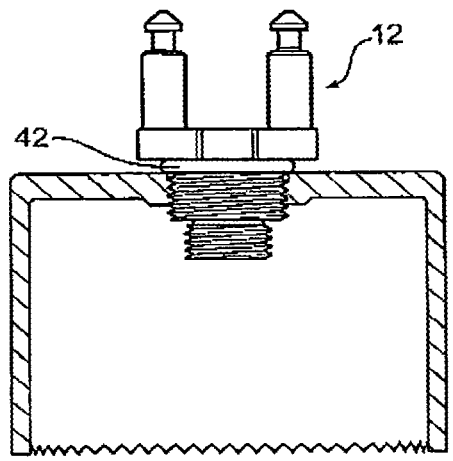

Thus the reader should appreciate that the inclusion of driving pins overcomes the problem of thread stripping since the rotational force is provided from the mandrel to the hole saw through the driving pins, rather than through the thread. Thus as illustrated in FIG. 4(a) a typical hole saw 26 includes the standard threaded central aperture 32 as well as driving apertures 24. To use the present assembly it is typical for the boss 12 to be screwed onto the hole saw 26. Since the upper disk 40 of the boss is typically greater than 25 mm in diameter, as illustrated in FIG. 4(b) the boss grooves 39 are adapted to align with the driving apertures 24 to ensure that the driving pins 22 extend into the hole saw.

To further assist in the attachment of the boss to the hole saw there may be provided a compressible O-ring 42. This ring may assist in maintaining alignment of the grooves 39 with the driving apertures 24 since it enables the boss to rotate through an angle of some 90 degrees whilst the boss and the hole saw are tightly engaged to each other. This allows the user to ensure that the alignment can occur, and remains throughout use of the tool without over tightening on the threads, as would be the case if no O-ring is used. Such an O-ring may be made from well known materials such as rubber.

Whilst FIGS. 1-4 illustrated a small mandrel whose outer diameter was smaller than 25 mm, thus necessitating that the driving pins to extend from the outside of the mandrel, in some cases, as shown in FIG. 5, mandrel 44 may indeed be much larger than 25 mm so that the driving pins 46 extend from the mandrel rather than on the outside of it.

Illustrated in FIGS. 6(a) and 6(b) is a further advantage of the O-ring 42. As the boss 12 is being screwed onto the hole saw 26 the O-ring 42 starts to be compressed. Provided that the thickness of the O-ring is sufficient compression of the O-ring continues until grooves 39 align with apertures 24. When finally they do the O-ring maintains the contact between the hole saw and the boss ensuring that the two remain connected and form an integral unit. The O-ring also assist in minimising or eliminating vibration between the hole saw and the assembly. Mandrel 16 can now be attached to the hole saw 26 and boss 12 with driving pins 22 being pre aligned with driving apertures 24 in the saw.

However, in a further preferred embodiment of the present invention the driving pins 22 may be longitudinally biased so that they are biased outwardly by the use of springs 48 that extend the driving pins outwardly from a driving pin bore 50. The reader should appreciate the advantages of this configuration as illustrated in FIGS. 7(a) and 7(b). The biasing of the springs allows the assembled mandrel and boss to be screwed onto the hole saw whether or not there is an O-ring present. As the driving pins then abut the upper surface of the hole saw they are compressed back into bore 50 until they align with the apertures 24. At that stage the biasing forces them into the apertures 24 effectively locking the driving pins into position as illustrated in FIG. 8.

The reader should appreciate this point in that if the grooves and not aligned with the apertures once the mandrel is attached to the boss the mandrel and the boss can be rotated with respect to the hole saw until the grooves and the apertures align at which time the driving pins engage the driving apertures. After removing the mandrel the boss and the hole then remain in the relative position with the grooves aligned with the apertures.

Such an arrangement may also very well be used on hole saws that do not have a driving aperture. In that case, as shown in FIG. 9, the biased driving pins are simply compressed into their bore 50 by shoulder 39 of the boss 38, the drive pins now engage the grooves or shoulders 39 and drive the boss enabling the assembly to be attached to the mandrel without having to worry about the driving pins 22 clashing with the hole saw as would be the case if they were fixed.

Thus the advantage of the preset invention is that once the boss and the hole saw have been attached to each other, they remain so basically until the hole saw needs to be replaced. The user only ever thereafter needs to simply attach the integral hole saw and the boss to a mandrel.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

In any claims that follow and in the summary of the invention, except where the context requires otherwise due to express language or necessary implication, the word "comprising" is used in the sense of "including", i.e. the features specified may be associated with further features in various embodiments of the invention.

The invention claimed is:

1. A hole-saw assembly including: a hole-saw having at one end a plurality of cutting teeth and two symmetrically opposing driving apertures, said hole-saw including a center thread; a boss including a threaded shaft adapted to engage the hole-saw center thread, said boss including two locking shafts; a mandrel coaxially aligned with said hole-saw and including a body having two bores therethrough coaxially aligned with said locking shafts; an annulus coaxially aligned with said mandrel and hole saw and including two holes, said annulus rotatable around its longitudinal axis from a first to a second position, wherein in said first position said annulus holes are aligned with said bores and said shafts allowing said shafts to be freely insertable and removable and in said second position said holes being misaligned thereby locking said shafts to said annulus; at least one driving pin integrally attached to said mandrel and adapted to engage said driving apertures; and wherein the boss includes two notches so located and dimensioned to accommodate the at least one driving pin to extend alongside the boss.

2. The hole-saw assembly as in claim 1 further including a compressible O-ring positioned between said boss and said hole-saw.

3. The hole-saw assembly as in claim 1 wherein said shafts include a flute adjacent said outer end and a cap on said outer end, the cap having an inner surface adapted to engage the annulus when said annulus is in said second position to thereby lock the shafts from longitudinal movement from the annulus.

4. The hole-saw assembly as in claim 1 including a drill-bit mounted on said mandrel, said drill-bit extending through and beyond said hole-saw.

5. The hole-saw assembly as in claim 1 wherein at least one said driving pin is longitudinally biased.

6. The hole saw assembly as in claim 5 wherein said biasing is provided by a spring.

7. The hole-saw assembly as in claim 1, wherein the assembly includes two driving pins and the driving pins are so dimensioned to extend along side the boss and engage the driving apertures of the hole-saw.

8. A hole saw assembly including a hole-saw, a boss, and a mandrel; the hole saw having at one end a plurality of cutting teeth and at the other end at least one driving aperture; the boss having at one end at least one thread for engaging the hole saw and at the other end a means for engaging the mandrel; the mandrel coaxially aligned with the hole saw and having a means to lockably engage the boss and including a body having at least one driving pin adapted to engage the at least one driving aperture; and wherein the boss means for engaging the mandrel are two shafts adapted to engage two bores in said mandrel.

9. The hole saw assembly as in claim 8 wherein the means to lockably engage the boss includes an annulus coaxially aligned with said mandrel and hole saw and including two holes, said annulus rotatable around its longitudinal axis from a first to a second position, wherein in said first position said annulus holes are aligned with the bores and said shafts allowing said shafts to be freely insertable and removable and in said second position said holes are misaligned thereby locking said shafts to said annulus.

* * * * *